United States Patent
Washizu

(10) Patent No.: US 9,758,652 B2
(45) Date of Patent: Sep. 12, 2017

(54) RUBBER COMPOSITION FOR TIRE

(71) Applicant: SUMITOMO RUBBER INDUSTRIES, LTD., Kobe-shi, Hyogo (JP)

(72) Inventor: Kensuke Washizu, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 0 days.

(21) Appl. No.: 15/276,222

(22) Filed: Sep. 26, 2016

(65) Prior Publication Data

US 2017/0096550 A1    Apr. 6, 2017

(30) Foreign Application Priority Data

Oct. 6, 2015   (JP) .................. 2015-198706

(51) Int. Cl.
| | |
|---|---|
| *B60C 1/00* | (2006.01) |
| *C08L 53/00* | (2006.01) |
| *C08L 9/00* | (2006.01) |
| *C08F 293/00* | (2006.01) |
| *C08L 9/06* | (2006.01) |
| *C08L 21/00* | (2006.01) |
| *C08L 57/00* | (2006.01) |
| *C08L 57/02* | (2006.01) |
| *C08L 57/10* | (2006.01) |

(52) U.S. Cl.
CPC .................. *C08L 9/06* (2013.01); *B60C 1/00* (2013.01); *B60C 1/0016* (2013.04); *C08L 21/00* (2013.01); *C08L 57/00* (2013.01); *C08L 57/02* (2013.01); *C08L 57/10* (2013.01); *C08L 2205/03* (2013.01)

(58) Field of Classification Search
CPC ..... C08J 3/00; C08J 3/40; C08L 53/00; C08L 9/00
USPC ............... 524/505, 494; 525/88, 89, 98, 314
See application file for complete search history.

(56) References Cited

U.S. PATENT DOCUMENTS

| | | | | |
|---|---|---|---|---|
| 6,329,459 B1 * | 12/2001 | Kang | .................... | C08F 297/04 524/494 |
| 8,362,118 B2 * | 1/2013 | Mihara | ................. | B60C 1/0016 524/492 |

FOREIGN PATENT DOCUMENTS

JP        2004-137463 A    5/2004

* cited by examiner

*Primary Examiner* — William Cheung
(74) *Attorney, Agent, or Firm* — Birch, Stewart, Kolasch & Birch, LLP

(57) ABSTRACT

An object of the present invention is to provide a rubber composition for tire that is excellent in abrasion resistance, initial grip performance and stability of grip performance while maintaining processability. The rubber composition for tire comprises a diene rubber component, a hydrocarbon resin containing a component unit derived from a monomer component having a heteroatom or a hydrogenated product thereof (resin A) and a hydrocarbon resin that does not contain a component unit derived from a monomer component having a heteroatom or a hydrogenated product thereof (resin B), wherein a content ratio (mass ratio) of the resin B to the resin A is 0.1 to 50.

8 Claims, No Drawings

RUBBER COMPOSITION FOR TIRE

TECHNICAL FIELD

The present invention relates to a rubber composition for tire.

BACKGROUND OF THE INVENTION

For a rubber composition for tread of pneumatic tires, in particular a rubber composition for tread of high performance tires such as tires for competition, there is a strong demand of high grip performance from the beginning of running (initial grip performance) and stable grip performance during running (stability of grip performance), and various measures have been taken to secure the both performance.

A method of improving grip performance by compounding a resin having a particular physical property or chemical structure in a rubber composition for tread has been considered (JP 2004-137463 A and the like). For example, in order to improve initial grip performance, a method of increasing a compounded amount of a low softening point resin, liquid polymer and the like or a method of compounding a softener with a low temperature has been considered. On the other hand, in order to obtain stability of grip performance, a method of compounding a high softening point resin in a rubber composition for tread has been considered.

However, in tires having a tread compounding a low softening point resin, while initial grip performance is improved, there is a problem that stability of grip performance is lowered as a temperature of the tread increases. On the other hand, in tires having a tread compounding a high softening point resin, there is a problem that initial grip performance is significantly deteriorated while stability of grip performance can be obtained.

In order to solve these problems, a method of compounding a combination of a low softening point resin and a high softening point resin in a rubber composition is considered. However, since a total amount of resin compounded in a rubber composition widely affects a temperature property of the whole rubber, the total amount of resin which can be compounded into the rubber composition is limited. As a result, in a rubber composition using a combination of a low softening point resin and a high softening point resin, initial grip performance and stability of grip performance cannot be obtained as the case where each resin is compounded alone. Additionally, grip performance and abrasion resistance are counter-performance.

In view of a chemical structure of resins, a hydrocarbon resin containing a component unit derived from a monomer component having a heteroatom (for example, coumarone-indene resin, phenolic resin, which are hereinafter referred to as polar resins) has a high polarity and thus it adheres to a metal portion of a rotor or roller and arises a problem that processability thereof is deteriorated. Therefore, while these polar resins are excellent in stability of grip performance, the total amount of polar resins which can be compounded into a rubber composition is limited.

On the other hand, while a hydrocarbon resin that does not contain a component unit derived from a monomer component having a heteroatom (hereinafter referred to as nonpolar resins) is excellent in processability, abrasion resistance and initial grip performance, stability of grip performance is inferior compared to that of polar resins. It is noted that the reason of excellent processability, abrasion resistance and initial grip performance of nonpolar resins seems to be their non-polarity and high solubility with nonpolar rubber components.

SUMMARY OF THE INVENTION

The present invention aims to solve the above problems and provide a rubber composition for tire that is excellent in abrasion resistance, initial grip performance and stability of grip performance while maintaining processability.

The present invention relates to a rubber composition for tire comprising a diene rubber component, a hydrocarbon resin containing a component unit derived from a monomer component having a heteroatom or a hydrogenated product thereof (resin A) and a hydrocarbon resin that does not contain a component unit derived from a monomer component having a heteroatom or a hydrogenated product thereof (resin B), wherein a content ratio (mass ratio) of the resin B to the resin A is 0.1 to 50.

It is preferable that a total content of the resin A and the resin B based on 100 parts by mass of the diene rubber component is 1 to 100 parts by mass.

It is preferable that the diene rubber component is a diene rubber component containing a styrene-butadiene copolymer rubber.

According to the present invention, a rubber composition for tire that is excellent in abrasion resistance, initial grip performance and stability of grip performance while maintaining processability can be provided.

DETAILED DESCRIPTION

The rubber composition for tire of the present invention is a rubber composition for tire comprising "resin A", which is a hydrocarbon resin containing a component unit derived from a monomer component having a heteroatom or a hydrogenated product thereof, and "resin B", which is a hydrocarbon resin that does not contain a component unit derived from a monomer component having a heteroatom or a hydrogenated product thereof, in a diene rubber component in a predetermined content ratio.

The diene rubber component is not limited particularly, and examples thereof include an isoprene-based rubber including a natural rubber (NR) and a polyisoprene rubber (IR), a butadiene rubber (BR), a styrene-butadiene copolymer rubber (SBR), a styrene-isoprene-butadiene copolymer rubber (SIBR), a chloroprene rubber (CR), an acrylonitrile-butadiene copolymer rubber (NBR) and the like. These rubber components may be used alone, or may be used in combination with two or more thereof. Among these, it is preferable that the diene rubber component comprises an SBR since satisfactory grip performance and abrasion resistance can be obtained and it is more preferable that the diene rubber component consists of an SBR only.

The styrene-butadiene rubber (SBR) is not limited particularly and examples thereof include an emulsion-polymerized SBR (E-SBR), a solution-polymerized SBR (S-SBR) and the like and may or may not be oil extended. A terminal-modified S-SBR or a main chain-modified S-SBR in which an interaction force with fillers is improved may also be used. These SBRs may be used alone, or may be used in combination with two or more thereof.

The weight-average molecular weight (Mw) of the SBR is preferably not less than 100,000 and more preferably not less than 150,000 from the viewpoint of grip performance and abrasion resistance. On the other hand, the weight-average molecular weight is preferably not more than 3,000, 000 and more preferably not more than 2,000,000 from the viewpoint of processability. In the specification, the weight-average molecular weight of the SBR can be calculated with polystyrene standards based on the measured value obtained using a gel permeation chromatography (GPC) (GPC-8000 series manufactured by Tosoh Corporation, detector: differential refractometer, column: TSKGEL SUPERMALTPORE HZ-M manufactured by Tosoh Corporation).

The content of the SBR in the rubber component is preferably not less than 60% by mass, more preferably not less than 65% by mass, further preferably not less than 70% by mass since sufficient grip performance can be obtained. The upper limit of the content of the SBR is not limited particularly, but from the viewpoint of grip performance, is preferably 100% by mass.

The hydrocarbon resin containing a component unit derived from a monomer component having a heteroatom or a hydrogenated product thereof (resin A) is a hydrocarbon resin containing at least one or more of monomer components containing an atom other than carbon and hydrogen (heteroatom) such as phenol, coumarone, acryl, urethane, maleic acid and the like as a component unit and a hydrogenated product thereof. Examples of the resin A include a coumarone-indene resin, a phenol-based resin, a terpene phenolic resin, and hydrogenated products thereof and the like.

The resin A is a polar resin having a high polarity as it contains a heteroatom and a rubber composition comprising this resin can improve stability of grip performance. On the other hand, in the case where the rubber composition comprises the resin A only, processability tends to deteriorate.

The content of the resin A based on 100 parts by mass of the diene rubber component is preferably 1 to 60 parts by mass, more preferably 5 to 50 parts by mass from the viewpoint of a favorable balance among processability, grip performance and abrasion resistance.

On the other hand, the hydrocarbon resin that does not contain a component unit derived from a monomer component having a heteroatom or a hydrogenated product thereof (resin B) is a hydrocarbon resin consisting of a component unit derived from a monomer component comprising a carbon atom and a hydrogen atom such as terpene, vinyl toluene, styrene, α-methylstyrene, indene and the like only and a hydrogenated product thereof. Examples of the resin B include a terpene resin, a C9 petroleum-based resin, an aromatic terpene resin, and hydrogenated products thereof and the like.

Since the resin B is a nonpolar resin that does not contain a heteroatom and is excellent in solubility with a diene rubber component having a relatively low polarity, the resin B is considered to be excellent in processability, abrasion resistance and initial grip performance.

The content of the resin B based on 100 parts by mass of the diene rubber component is preferably 1 to 60 parts by mass, more preferably 5 to 50 parts by mass from the viewpoint of a favorable balance among processability, grip performance and abrasion resistance.

The content ratio (mass ratio) of the resin B to the resin A (content of resin B/content of resin A) in the rubber composition for tire of the present invention is 0.1 to 50, more preferably 0.1 to 10. Due to the content ratio of the resin B to the resin A within this range, a rubber composition for tire which is excellent in abrasion resistance, initial grip performance and stability of grip performance while maintaining processability can be obtained.

The total content of the resin A and resin B based on 100 parts by mass of the diene rubber component is preferably 1 to 100 parts by mass, more preferably 10 to 60 parts by mass from the viewpoint of a favorable balance among processability, grip performance and abrasion resistance.

The rubber composition of the present invention can suitably comprise, in addition to the above components, compounding agents generally used in the production of a rubber composition such as, for example, a filler, a coupling agent, a plasticizer, oil, a zinc oxide, a stearic acid, an anti-aging agent, wax, a vulcanizing agent, a vulcanization accelerator and the like as necessary.

The filler may be optionally selected from ones commonly used in a conventional rubber composition for tire such as carbon black, silica, calcium carbonate, alumina, clay, talc and the like and used. Among these, carbon black is preferable from the viewpoint of reinforcing property.

The nitrogen adsorption specific surface area of carbon black is preferably not less than 100 $m^2/g$, more preferably not less than 105 $m^2/g$ since sufficient grip performance can be obtained. On the other hand, the nitrogen adsorption specific surface area of carbon black is preferably not more than 300 $m^2/g$, more preferably not more than 250 $m^2/g$ since a satisfactory dispersed state can be maintained and sufficient grip performance can be obtained. It is noted that the nitrogen adsorption specific surface area of carbon black is determined in accordance with JIS K 6217-2.

The oil absorption number (OAN) of carbon black is preferably not less than 100 $cm^3/100$ g, more preferably not less than 110 $cm^3/100$ g since sufficient abrasion resistance can be obtained. On the other hand, the OAN is preferably not more than 150 $cm^3/100$ g, more preferably not more than 145 $cm^3/100$ g since sufficient grip performance can be obtained. It is noted that the OAN of carbon black is measured in accordance with JIS K 6217-4.

In the case where the rubber composition comprises the carbon black, the content thereof based on 100 parts by mass of the rubber component is preferably not less than 70 parts by mass, more preferably not less than 80 parts by mass, further preferably not less than 100 parts by mass from the viewpoint of abrasion resistance and grip performance. On the other hand, the content is preferably not more than 200 parts by mass, more preferably not more than 180 parts by mass from the viewpoint of grip performance.

Examples of the vulcanization accelerator include a sulfenamide vulcanization accelerator, a thiazole vulcanization accelerator, a thiuram vulcanization accelerator, a guanidine vulcanization accelerator, a dithiocarbamate vulcanization accelerator, and among these, a sulfenamide vulcanization accelerator and a dithiocarbamate vulcanization accelerator can be suitably used.

Examples of the sulfenamide vulcanization accelerator include N-tert-butyl-2-benzothiazolylsulfenamide (NS), N-cyclohexyl-2-benzothiazolylsulfenamide (CZ), N-oxydiethylene-2-benzothiazolylsulfenamide (MSA) and the like and among these, it is preferable to use NS or CZ.

Examples of the dithiocarbamate vulcanization accelerator include zinc dibenzyldithiocarbamate (ZTC), zinc dimethyldithiocarbamate (PZ), zinc N-pentamethylenedithiocarbamate (ZP), sodium dibutyldithiocarbamate (TP) and the like and among these, it is preferable to use ZTC.

In the case where the rubber composition comprises a vulcanization accelerator, the content thereof based on 100 parts by mass of the rubber component is preferably not less than 1 part by mass, more preferably not less than 3 parts by mass since a sufficient vulcanization speed can be secured and satisfactory grip performance and abrasion resistance can be obtained. On the other hand, the content of the vulcanization accelerator is preferably not more than 15 parts by mass, more preferably not more than 10 parts by mass since deterioration of grip performance and abrasion resistance due to blooming is prevented.

The vulcanizing agent is preferably sulfur. In the case where the rubber composition comprises sulfur, the content thereof based on 100 parts by mass of the rubber component is preferably not less than 0.5 part by mass since a sufficient vulcanization speed can be secured and satisfactory grip performance and abrasion resistance can be obtained. On the other hand, the content is preferably not more than 3 parts by mass since deterioration of grip performance and abrasion resistance due to blooming is prevented.

The zinc oxide is not limited particularly as long as it is ones that have been used in the rubber industry such as in tires, but it is preferable to use fine particle zinc oxide.

The average primary particle size of the zinc oxide is preferably not more than 200 nm, more preferably not more than 100 nm since abrasion resistance is not negatively affected. On the other hand, while a lower limit of the average primary particle size of the zinc oxide is not limited particularly, the average primary particle size of the zinc oxide is preferably not less than 20 nm, more preferably not less than 30 nm. It is noted that the average primary particle size of the zinc oxide in the specification is an average particle size (average primary particle size) which is converted from a specific surface area measured in accordance with a BET method based on nitrogen adsorption.

In the case where the rubber composition comprises a zinc oxide, the content thereof based on 100 parts by mass of the diene rubber component is preferably not less than 0.5 part by mass, more preferably not less than 1.0 part by mass. On the other hand, the content of the zinc oxide is preferably not more than 10 parts by mass, more preferably not more than 5 parts by mass. If the content of the zinc oxide is within the above range, the effect of the present invention can suitably obtained.

A known method can be used as a production method of the rubber composition for tire of the present invention and for example, the rubber composition can be produced by a method of kneading each of components with a Banbury mixer, a kneader, an open roll and the like and subsequently vulcanizing the same. Additionally, the rubber composition for tire of the present invention can be suitably used for a tread of a pneumatic tire since it is excellent in abrasion resistance, initial grip performance and stability of grip performance while maintaining processability.

The pneumatic tire can be produced by a general method using the rubber composition of the present invention. That is, the rubber composition is extruded into the shape of a tread in an unvulcanized state, laminated with other components of the tire on a tire building machine and formed in a normal method to obtain an unvulcanized tire. This unvulcanized tire is heated and pressurized in a vulcanizer to produce a pneumatic tire using the rubber composition for tire of the present invention. It is noted that the pneumatic tire in the present invention can be suitably used for tires for competition such as a race, in particular high performance dry tires used on a dry road surface.

EXAMPLE

Hereinafter, the present invention will be described based on Examples, but the present invention is not limited thereto only.

A variety of chemicals used in Examples and Comparative Examples will be explained.

SBR: prepared in the production method of SBR as described below (Mw: 190,000)
Hexane: anhydrous hexane manufactured by KANTO CHEMICAL CO., INC.
Isopropanol: special grade isopropanol manufactured by KANTO CHEMICAL CO., INC.
TMEDA: tetramethylethylenediamine manufactured by Kishida Chemical Co., Ltd.
Butadiene: 1,3-butadiene manufactured by Takachiho Chemical Industrial Co., Ltd.
Styrene: styrene manufactured by Wako Pure Chemical Industries, Ltd.
Resin 1: YS resin PX100 (polyterpene resin, nonpolar resin) manufactured by YASUHARA CHEMICAL CO., LTD.
Resin 2: CLEARON P105 (hydrogenated polyterpene resin, nonpolar resin) manufactured by YASUHARA CHEMICAL CO., LTD.
Resin 3: NEOPOLYMER L90 (C9 petroleum-based resin, nonpolar resin) manufactured by Nippon Petrochemicals Co., Ltd.
Resin 4: ARKON M100 (hydrogenated petroleum-based resin, nonpolar resin) manufactured by Arakawa Chemical Industries, Ltd.
Resin 5: YS resin TO125 (aromatic terpene resin, nonpolar resin) manufactured by YASUHARA CHEMICAL CO., LTD.
Resin 6: CLEARON M125 (aromatic terpene resin, nonpolar resin) manufactured by YASUHARA CHEMICAL CO., LTD.
Resin 7: NITTO resin G-90 (coumarone-indene resin, polar resin) manufactured by NITTO CHEMICAL CO., LTD.
Resin 8: KORESIN (phenol-based resin, polar resin) manufactured by BASF SE
Resin 9: YS POLYSTER U115 (terpene phenolic resin, polar resin) manufactured by YASUHARA CHEMICAL CO., LTD.
Resin 10: YS POLYSTER UH115 (hydrogenated terpene phenolic resin, polar resin) manufactured by YASUHARA CHEMICAL CO., LTD.
Process oil: Diana Process AH-24 manufactured by Idemitsu Kosan Co., Ltd.
Plasticizer: SANSO CIZER DOS manufactured by Kyowa Hakko Co., Ltd.
Carbon black: SEAST 9SAF ($N_2SA$: 142 $m^2/g$, DBP oil absorption amount: 115 ml/100 g) manufactured by Tokai Carbon Co., Ltd.
Anti-aging agent 1: Nocrack 6C (N-(1,3-dimethylbutyl)-N-phenyl-p-phenylenediamine, 6PPD) manufactured by Ouchi Shinko Chemical Industrial Co., Ltd.
Anti-aging agent 2: Nocrack RD4 (poly(2,2,4-trimethyl-1,2-dihydroquinoline)) manufactured by Ouchi Shinko Chemical Industrial Co., Ltd.
Stearic acid: Stearic acid "Tsubaki" manufactured by NOF CORPORATION
Zinc oxide: ZINCOX SUPER F1 (average primary particle size: 100 nm) manufactured by HakusuiTech Co., Ltd.
Wax: SUNNOC N manufactured by Ouchi Shinko Chemical Industrial Co., Ltd.
Sulfur: powder sulfur manufactured by Karuizawa Sulfur Co., Ltd.
Vulcanization accelerator: NOCCELER CZ (N-cyclohexyl-2-benzothiazylsulfenamide) manufactured by Ouchi Shinko Chemical Industrial Co., Ltd.

Production Method of SBR

To a 3-liter pressure resistant stainless steel vessel which had been sufficiently replaced with nitrogen were added 1,800 g of hexane, 150 g of butadiene, 50 g of styrene and 0.22 mmol of TMEDA. Then, a small amount of n-butyllithium/hexane solution was put into the polymerization vessel as a scavenger for previously neutralizing impurities that affect deactivation of a polymerization initiator. Further, n-butyllithium/hexane solution (content of n-butyllithium: 1.17 mmol) was added, followed by polymerization reaction for three hours at 50° C. After three hours, 1.15 ml of 1M isopropanol/hexane solution was dropped and the reaction was terminated. Then, the polymerization solution was evaporated for 24 hours at room temperature and further dried for 24 hours at 80° C. under reduced pressure to obtain an SBR. The degree of polymerization was nearly 100%. The molecular weight and molecular weight distribution of the obtained copolymer was 190,000 in a weight-average molecular weight (molecular weight distribution: 1.12).

Examples and Comparative Examples

According to formulations shown in Tables 1 to 3, all of the chemicals (other than sulfur and vulcanization accelerator) were kneaded with a 1.7 L Banbury mixer manufactured by Kobe Steel, Ltd. to obtain a kneaded product (Banbury process). To the obtained kneaded product were added sulfur and the vulcanization accelerator and the mixture was kneaded using an open roll to obtain an unvulcanized rubber composition (open roll process). The obtained unvulcanized rubber composition was formed into the shape of a tread, laminated with other components of the tire in a tire building machine and vulcanized for 30 minutes under a condition of 150° C. to obtain tires for test (tire size: 215/45R17). With respect to the obtained tires for test, the following evaluations were conducted. The results are shown in Tables 1 to 3.

Processability

The degree of adhesion of the kneaded products to a rotor or a roller in the Banbury process and the open roll process was evaluated according to the following criteria.

○: Adhesion was hardly observed and there is no problem
Δ: The kneaded products adhered and it took more time to discharge rubber compared to "○"
x: Adhesion was strong and it took more time to discharge rubber compared to "Δ"

Initial Grip Performance

Each of the test tires was loaded on a domestically produced FR vehicle of 2000 cc displacement, followed by the in-vehicle running on a test course on a dry asphalt road for 10 laps. During running, stability of control in handling at the second lap was evaluated by a test driver and the results are shown with indexes, regarding the result of Comparative Example 2 as 100 (initial grip performance index). The greater number implies higher initial grip performance.

Stability of Grip Performance

Each of the test tires was loaded on a domestically produced FR vehicle of 2000 cc displacement, followed by the in-vehicle running on a test course on a dry asphalt road for 10 laps. During running, stability of control in handling at the best lap and at the final lap was evaluated by a test driver and the results are shown with indexes, regarding the result of Comparative Example 2 as 100 (grip performance stability index). The greater number implies that deterioration of grip performance during running on the dry road surface is small and stable grip performance during running can be suitably obtained.

Abrasion Resistance

Each of the test tires was loaded on a domestically produced FR vehicle of 2000 cc displacement, followed by the in-vehicle running on a test course on a dry asphalt road. After running, the amount of a remained groove of the tread rubber of tires was measured (15 mm in a new product) and the results are shown with indexes, regarding the amount of the remained groove of Comparative Example 2 as 100 (abrasion resistance index). The greater number implies higher abrasion resistance.

TABLE 1

| | COMPARATIVE EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| Compounding amount (part by mass) | | | | | | | | | | | |
| SBR | 100 | 100 | 100 | 100 | 100 | 100 | 100 | 100 | 100 | 100 | 100 |
| Resin 1 | 10 | 50 | — | — | — | — | — | — | — | — | — |
| Resin 2 | — | — | 50 | — | — | — | — | — | — | — | — |
| Resin 3 | — | — | — | 50 | — | — | — | — | — | — | — |
| Resin 4 | — | — | — | — | 50 | — | — | — | — | — | — |
| Resin 5 | — | — | — | — | — | 50 | — | — | — | — | — |
| Resin 6 | — | — | — | — | — | — | 50 | — | — | — | — |
| Resin 7 | — | — | — | — | — | — | — | 50 | — | — | — |
| Resin 8 | — | — | — | — | — | — | — | — | 50 | — | — |
| Resin 9 | — | — | — | — | — | — | — | — | — | 50 | — |
| Resin 10 | — | — | — | — | — | — | — | — | — | — | 50 |
| Oil | 70 | 30 | 30 | 30 | 30 | 30 | 30 | 30 | 30 | 30 | 30 |
| Plasticizer | 20 | 20 | 20 | 20 | 20 | 20 | 20 | 20 | 20 | 20 | 20 |
| Carbon black | 100 | 100 | 100 | 100 | 100 | 100 | 100 | 100 | 100 | 100 | 100 |
| Anti-aging agent 1 | 1 | 1 | 1 | 1 | 1 | 1 | 1 | 1 | 1 | 1 | 1 |
| Anti-aging agent 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 | 1.4 |
| Wax | 4 | 4 | 4 | 4 | 4 | 4 | 4 | 4 | 4 | 4 | 4 |
| Sulfur | 1 | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 | 4 |
| Evaluation result | | | | | | | | | | | |
| Processability | x | ○ | ○ | ○ | ○ | ○ | Δ | x | x | x | x |
| Initial grip performance index | 83 | 100 | 95 | 100 | 103 | 106 | 97 | 98 | 95 | 92 | 92 |

TABLE 1-continued

| | COMPARATIVE EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| Grip performance stability index | 82 | 100 | 100 | 98 | 101 | 94 | 93 | 111 | 117 | 114 | 108 |
| Abrasion resistance index | 82 | 100 | 110 | 101 | 99 | 105 | 110 | 92 | 88 | 98 | 101 |

TABLE 2

| | EXAMPLES | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Compounding amount (part by mass) | | | | | | | | | | | | |
| SBR | 100 | 100 | 100 | 100 | 100 | 100 | 100 | 100 | 100 | 100 | 100 | 100 |
| Resin 1 | 5 | — | — | — | — | — | 5 | — | — | — | — | — |
| Resin 2 | — | 5 | — | — | — | — | — | 5 | — | — | — | — |
| Resin 3 | — | — | 5 | — | — | — | — | — | 5 | — | — | — |
| Resin 4 | — | — | — | 5 | — | — | — | — | — | 5 | — | — |
| Resin 5 | — | — | — | — | 5 | — | — | — | — | — | 5 | — |
| Resin 6 | — | — | — | — | — | 5 | — | — | — | — | — | 5 |
| Resin 7 | 45 | 45 | 45 | 45 | 45 | 45 | — | — | — | — | — | — |
| Resin 8 | — | — | — | — | — | — | 45 | 45 | 45 | 45 | 45 | 45 |
| Resin 9 | — | — | — | — | — | — | — | — | — | — | — | — |
| Resin 10 | — | — | — | — | — | — | — | — | — | — | — | — |
| Oil | 30 | 30 | 30 | 30 | 30 | 30 | 30 | 30 | 30 | 30 | 30 | 30 |
| Plasticizer | 20 | 20 | 20 | 20 | 20 | 20 | 20 | 20 | 20 | 20 | 20 | 20 |
| Carbon black | 100 | 100 | 100 | 100 | 100 | 100 | 100 | 100 | 100 | 100 | 100 | 100 |
| Anti-aging agent 1 | 1 | 1 | 1 | 1 | 1 | 1 | 1 | 1 | 1 | 1 | 1 | 1 |
| Anti-aging agent 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 | 1.4 | 1.4 |
| Wax | 4 | 4 | 4 | 4 | 4 | 4 | 4 | 4 | 4 | 4 | 4 | 4 |
| Sulfur | 1 | 1 | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 | 4 | 4 |
| Evaluation result | | | | | | | | | | | | |
| Processability | ○ | ○ | ○ | ○ | ○ | ○ | ○ | ○ | ○ | ○ | ○ | ○ |
| Initial grip performance index | 101 | 102 | 101 | 102 | 105 | 103 | 102 | 101 | 103 | 105 | 105 | 106 |
| Grip performance stability index | 113 | 114 | 112 | 114 | 113 | 114 | 117 | 118 | 117 | 119 | 116 | 114 |
| Abrasion resistance index | 101 | 102 | 102 | 103 | 101 | 103 | 101 | 101 | 101 | 102 | 102 | 101 |

| | EXAMPLES | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Compounding amount (part by mass) | | | | | | | | | | | | |
| SBR | 100 | 100 | 100 | 100 | 100 | 100 | 100 | 100 | 100 | 100 | 100 | 100 |
| Resin 1 | 5 | — | — | — | — | — | 5 | — | — | — | — | — |
| Resin 2 | — | 5 | — | — | — | — | — | 5 | — | — | — | — |
| Resin 3 | — | — | 5 | — | — | — | — | — | 5 | — | — | — |
| Resin 4 | — | — | — | 5 | — | — | — | — | — | 5 | — | — |
| Resin 5 | — | — | — | — | 5 | — | — | — | — | — | 5 | — |
| Resin 6 | — | — | — | — | — | 5 | — | — | — | — | — | 5 |
| Resin 7 | — | — | — | — | — | — | — | — | — | — | — | — |
| Resin 8 | — | — | — | — | — | — | — | — | — | — | — | — |
| Resin 9 | 45 | 45 | 45 | 45 | 45 | 45 | — | — | — | — | — | — |
| Resin 10 | — | — | — | — | — | — | 45 | 45 | 45 | 45 | 45 | 45 |
| Oil | 30 | 30 | 30 | 30 | 30 | 30 | 30 | 30 | 30 | 30 | 30 | 30 |
| Plasticizer | 20 | 20 | 20 | 20 | 20 | 20 | 20 | 20 | 20 | 20 | 20 | 20 |
| Carbon black | 100 | 100 | 100 | 100 | 100 | 100 | 100 | 100 | 100 | 100 | 100 | 100 |
| Anti-aging agent 1 | 1 | 1 | 1 | 1 | 1 | 1 | 1 | 1 | 1 | 1 | 1 | 1 |
| Anti-aging agent 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 | 1.4 | 1.4 |
| Wax | 4 | 4 | 4 | 4 | 4 | 4 | 4 | 4 | 4 | 4 | 4 | 4 |
| Sulfur | 1 | 1 | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 | 4 | 4 |
| Evaluation result | | | | | | | | | | | | |
| Processability | ○ | ○ | ○ | ○ | ○ | ○ | ○ | ○ | ○ | ○ | ○ | ○ |
| Initial grip performance index | 105 | 107 | 107 | 104 | 106 | 105 | 104 | 103 | 105 | 104 | 104 | 103 |
| Grip performance stability index | 114 | 115 | 116 | 114 | 114 | 114 | 114 | 113 | 115 | 113 | 114 | 114 |
| Abrasion resistance index | 102 | 105 | 102 | 105 | 104 | 106 | 103 | 106 | 104 | 106 | 103 | 107 |

TABLE 3

| | EXAMPLES | | | | | | | | | | | |
|---|---|---|---|---|---|---|---|---|---|---|---|---|
| | 25 | 26 | 27 | 28 | 29 | 30 | 31 | 32 | 33 | 34 | 35 | 36 |
| Compounding amount (part by mass) | | | | | | | | | | | | |
| SBR | 100 | 100 | 100 | 100 | 100 | 100 | 100 | 100 | 100 | 100 | 100 | 100 |
| Resin 1 | 45 | — | — | — | — | — | 45 | — | — | — | — | — |
| Resin 2 | — | 45 | — | — | — | — | — | 45 | — | — | — | — |
| Resin 3 | — | — | 45 | — | — | — | — | — | 45 | — | — | — |
| Resin 4 | — | — | — | 45 | — | — | — | — | — | 45 | — | — |
| Resin 5 | — | — | — | — | 45 | — | — | — | — | — | 45 | — |
| Resin 6 | — | — | — | — | — | 45 | — | — | — | — | — | 45 |
| Resin 7 | 5 | 5 | 5 | 5 | 5 | 5 | — | — | — | — | — | — |
| Resin 8 | — | — | — | — | — | — | 5 | 5 | 5 | 5 | 5 | 5 |
| Resin 9 | — | — | — | — | — | — | — | — | — | — | — | — |
| Resin 10 | — | — | — | — | — | — | — | — | — | — | — | — |
| Oil | 30 | 30 | 30 | 30 | 30 | 30 | 30 | 30 | 30 | 30 | 30 | 30 |
| Plasticizer | 20 | 20 | 20 | 20 | 20 | 20 | 20 | 20 | 20 | 20 | 20 | 20 |
| Carbon black | 100 | 100 | 100 | 100 | 100 | 100 | 100 | 100 | 100 | 100 | 100 | 100 |
| Anti-aging agent 1 | 1 | 1 | 1 | 1 | 1 | 1 | 1 | 1 | 1 | 1 | 1 | 1 |
| Anti-aging agent 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 | 1.4 | 1.4 |
| Wax | 4 | 4 | 4 | 4 | 4 | 4 | 4 | 4 | 4 | 4 | 4 | 4 |
| Sulfur | 1 | 1 | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 | 4 | 4 |
| Evaluation result | | | | | | | | | | | | |
| Processability | ○ | ○ | ○ | ○ | ○ | ○ | ○ | ○ | ○ | ○ | ○ | ○ |
| Initial grip performance index | 102 | 104 | 103 | 104 | 103 | 104 | 103 | 103 | 102 | 103 | 104 | 103 |
| Grip performance stability index | 105 | 104 | 104 | 103 | 103 | 103 | 104 | 104 | 103 | 104 | 104 | 103 |
| Abrasion resistance index | 103 | 110 | 106 | 109 | 105 | 111 | 103 | 111 | 106 | 112 | 103 | 104 |

| | EXAMPLES | | | | | | | | | | | |
|---|---|---|---|---|---|---|---|---|---|---|---|---|
| | 37 | 38 | 39 | 40 | 41 | 42 | 43 | 44 | 45 | 46 | 47 | 48 |
| Compounding amount (part by mass) | | | | | | | | | | | | |
| SBR | 100 | 100 | 100 | 100 | 100 | 100 | 100 | 100 | 100 | 100 | 100 | 100 |
| Resin 1 | 45 | — | — | — | — | — | 45 | — | — | — | — | — |
| Resin 2 | — | 45 | — | — | — | — | — | 45 | — | — | — | — |
| Resin 3 | — | — | 45 | — | — | — | — | — | 45 | — | — | — |
| Resin 4 | — | — | — | 45 | — | — | — | — | — | 45 | — | — |
| Resin 5 | — | — | — | — | 45 | — | — | — | — | — | 45 | — |
| Resin 6 | — | — | — | — | — | 45 | — | — | — | — | — | 45 |
| Resin 7 | — | — | — | — | — | — | — | — | — | — | — | — |
| Resin 8 | — | — | — | — | — | — | — | — | — | — | — | — |
| Resin 9 | 5 | 5 | 5 | 5 | 5 | 5 | — | — | — | — | — | — |
| Resin 10 | — | — | — | — | — | — | 5 | 5 | 5 | 5 | 5 | 5 |
| Oil | 30 | 30 | 30 | 30 | 30 | 30 | 30 | 30 | 30 | 30 | 30 | 30 |
| Plasticizer | 20 | 20 | 20 | 20 | 20 | 20 | 20 | 20 | 20 | 20 | 20 | 20 |
| Carbon black | 100 | 100 | 100 | 100 | 100 | 100 | 100 | 100 | 100 | 100 | 100 | 100 |
| Anti-aging agent 1 | 1 | 1 | 1 | 1 | 1 | 1 | 1 | 1 | 1 | 1 | 1 | 1 |
| Anti-aging agent 2 | 2 | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 | 2 |
| Zinc oxide | 1.4 | 1.4 | 1.4 | 1.4 | 1.4 | 1.4 | 1.4 | 1.4 | 1.4 | 1.4 | 1.4 | 1.4 |
| Wax | 4 | 4 | 4 | 4 | 4 | 4 | 4 | 4 | 4 | 4 | 4 | 4 |
| Sulfur | 1 | 1 | 1 | 1 | 1 | 1 | 1 | 1 | 1 | 1 | 1 | 1 |
| Vulcanization accelerator | 4 | 4 | 4 | 4 | 4 | 4 | 4 | 4 | 4 | 4 | 4 | 4 |
| Evaluation result | | | | | | | | | | | | |
| Processability | ○ | ○ | ○ | ○ | ○ | ○ | ○ | ○ | ○ | ○ | ○ | ○ |
| Initial grip performance index | 103 | 103 | 104 | 104 | 103 | 104 | 102 | 101 | 103 | 103 | 106 | 103 |
| Grip performance stability index | 103 | 104 | 103 | 104 | 104 | 105 | 102 | 100 | 103 | 104 | 103 | 102 |
| Abrasion resistance index | 108 | 113 | 106 | 113 | 105 | 113 | 116 | 116 | 112 | 115 | 112 | 118 |

From the results shown in Tables 1 to 3, it can be found that the rubber composition for tire comprising a hydrocarbon resin containing a component unit derived from a monomer component having a heteroatom or a hydrogenated product thereof (resin A) and a hydrocarbon resin that does not contain a component unit derived from a monomer component having a heteroatom or a hydrogenated product thereof (resin B) in a predetermined content ratio based on a diene rubber component is excellent in abrasion resistance, initial grip performance and stability of grip performance while maintaining processability.

What is claimed is:
1. A rubber composition for tire comprising
   a diene rubber component,
   resin A comprising a coumarone-indene resin, a phenol-based resin, a terpene phenolic resin, or hydrogenated products thereof, and resin B comprising a terpene resin, a C9 petroleum-based resin, an aromatic terpene resin, or hydrogenated products thereof,
wherein a content ratio (mass ratio) of the resin B to the resin A is 0.1 to 50.

2. The rubber composition for tire of claim 1, wherein a total content of the resin A and resin B based on 100 parts by mass of the diene rubber component is 1 to 100 parts by mass.

3. The rubber composition for tire of claim 1, wherein the diene rubber component is a diene rubber component containing a styrene-butadiene copolymer rubber.

4. The rubber composition for tire of claim 2, wherein the diene rubber component is a diene rubber component containing a styrene-butadiene copolymer rubber.

5. A tire having a tread formed from the rubber composition of claim 1.

6. A tire having a tread formed from the rubber composition of claim 2.

7. A tire having a tread formed from the rubber composition of claim 3.

8. A tire having a tread formed from the rubber composition of claim 4.

* * * * *